United States Patent [19]

Sclufer

[11] Patent Number: 4,716,324
[45] Date of Patent: Dec. 29, 1987

[54] MAGNETHOYDRODYNAMIC ELECTRICAL POWER GENERATION

[76] Inventor: Nicholas Sclufer, 725 Dodds La., Gladwyne, Pa. 19035

[21] Appl. No.: 932,079

[22] Filed: Nov. 5, 1986

[51] Int. Cl.[4] .......................................... H02K 44/00
[52] U.S. Cl. ....................................................... 310/11
[58] Field of Search ........................................... 310/11

[56] References Cited

U.S. PATENT DOCUMENTS

| | | | |
|---|---|---|---|
| 3,450,906 | 6/1969 | Klopfer | 310/11 |
| 3,482,123 | 12/1969 | Covert | 310/11 |
| 3,585,422 | 6/1971 | Burnier | 310/11 |
| 3,851,195 | 11/1974 | Fauderer | 310/11 |
| 3,854,065 | 12/1974 | Rioux et al. | 310/11 X |

Primary Examiner—Donovan F. Duggan
Attorney, Agent, or Firm—W. Wyclif Walton

[57] ABSTRACT

This disclosure relates to the art of magnetohydrodynamic (MHD) energy generation and is particularly directed to improvements in energy generating apparatus useful in that art providing a generating channel presenting in at least a portion of its confining surface a movable wall resistant to erosion and other deterioration under the action of high temperature gaseous fluids and solid particles carried thereby in generating electric energy by their high velocity movement through a magnetic field.

6 Claims, 4 Drawing Figures

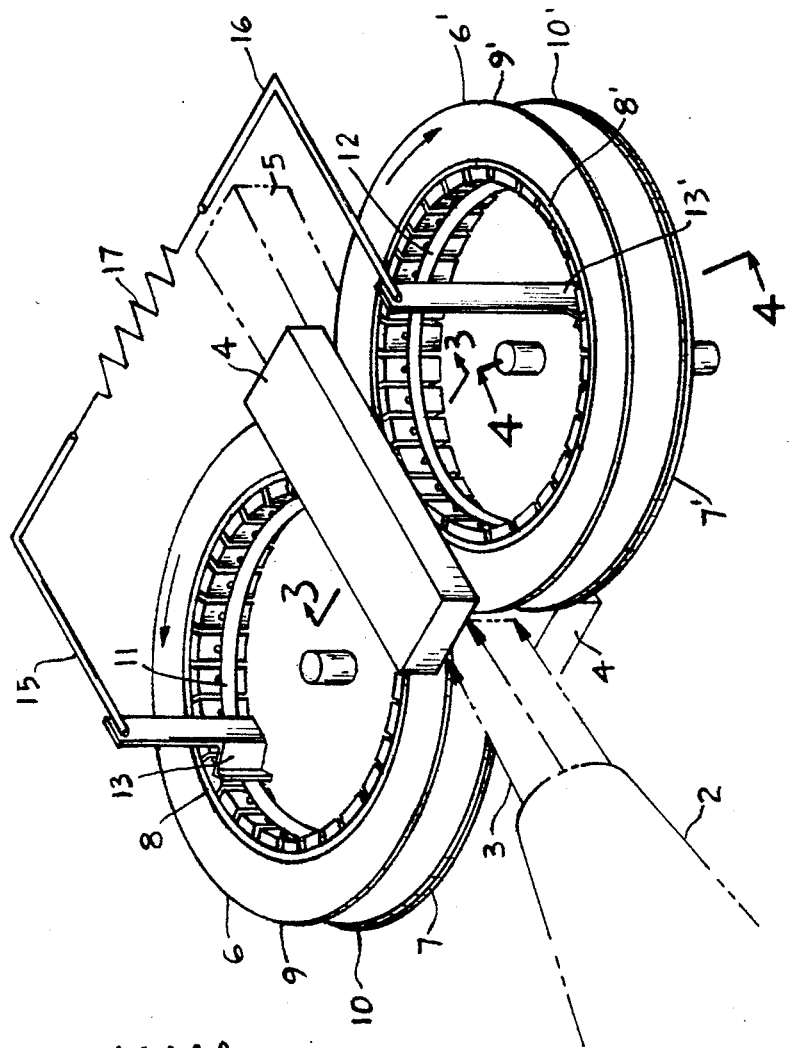
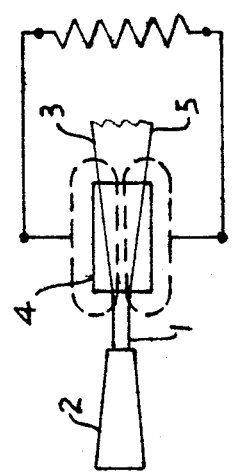
Fig. 1
Fig. 2

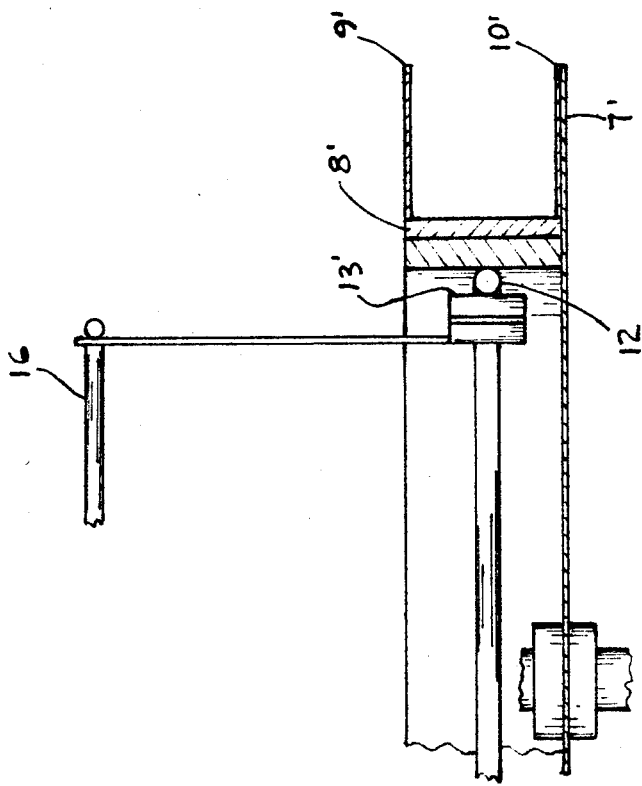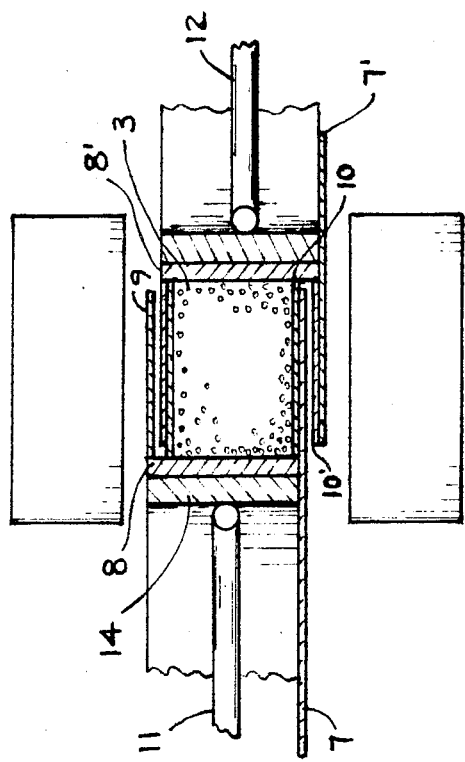

MAGNETHOYDRODYNAMIC ELECTRICAL POWER GENERATION

BACKGROUND OF THE INVENTION

The invention comprises improvements in the structure of confining surfaces, passages or chambers subject to contact by highly heated gaseous fluids as in the combustion chambers or generating channels in Magnetohydrodynamic (MHD) Electrical Power Generators and the like and particularly relates to reduction of the area of fixed confining surfaces presented by materials subject to excessive erosion or corrosion through contact with moving high temperature gaseous fluids sometimes carrying solid particles or "seed" which increase the eroding effects of the gaseous fluids themselves.

THE PRIOR ART

The recognized prior art is disclosed in detail in OPEN CYCLE MAGNETOHYDRODYNAMIC ELECTRICAL POWER GENERATION. General Editors, M. Petrick (U.S.A.) B. Ya Shumyatsky (U.S.S.R.), a joint U.S.A./U.S.S.R. publication, Argonne National Laboratory, Argonne, Ill., 1978, in which the problems arising from erosion of confining walls of the generator channel are fully set forth.

SUMMARY OF THE INVENTION

The invention is directed to the provision of a structure presenting one or more movable confining surfaces such as those defining in part the channel or generating zone of an MHD power generator, whereby the erosive effect of the passage of high velocity high temperature gaseous fluids is minimized and the continuity of operability of the generator thereby greatly extended in time as compared with generators in which the corresponding surfaces are presented by fixed structures which must be relatively frequently repaired or replaced and operation of the generator therefore interrupted. The principles utilized in the preferred embodiment of the invention are applicable elsewhere as well, for example in the combustion chamber of an MHD unit in which high temperature gaseous fluids are generated.

BRIEF DESCRIPTION OF THE DRAWING

In the accompanying drawing,

FIG. 1 is a schematic flow diagram illustrating the relationship between the courses of the flow of gaseous fluid and electrical energy in a basic MHD power generator;

FIG. 2 is a somewhat diagrammatic fragmentary perspective view of the generating zone of an MHD electrical power generator embodying my invention;

FIG. 3 is a fragmentary section on the line 3—3 of FIG. 2; and

FIG. 4 is a fragmentary somewhat diagrammatic radial section on the line 4-4 in FIG. 2.

DESCRIPTION OF THE PREFERRED EMBODIMENT OF THE INVENTION

Referring now more particularly to the drawing, a basic MHD electrical power generator such as diagrammatically illustrated in FIG. 1 may comprise a gaseous fluid source 1 usually including appropriate fuel supply means (not shown) and a combustion chamber 2. The stream of combustion products or other high temperature gaseous fluid delivered from chamber 2 is confined in means defining a generating channel 3 positioned in a magnetic field maintained by a magnet 4. Beyond the magnetic field in the direction of flow of the gaseous fluid a diffusion conduit 5 may lead the said fluid to a heat exchanger (not shown) or other apparatus for utilizing the heat carried by the fluid, this aspect of the generator constituting no part of my invention although, as has been stated, the principles of the invention may be applied to the construction of the combustion chamber if desired.

Means (not shown) may be provided for introducing into the stream of high temperature gaseous fluid prior to or concurrently with its entry into the magnetic field of magnet 4 electrically conductive particles or "seed" which tend to increase the electrical conductivity of the stream, such means constituting no part of the invention but being relevant due to the increased erosive effects of such particles on the generator channel walls as compared with gaseous fluids not containing such particles.

In accordance with the invention the channel of the generator within the magnetic field maintained by magnet 4 is defined on at least one side, and preferably on all four sides as shown by movable means, for example, by a pair of rotors 6.6' each comprising a disc or circular plate 7.7' mounted for rotation about a central axis normal to the direction of flow of the gaseous fluid stream. Each rotor 6.6', also comprises a ring 8,8' hereinafter more fully described, from the edges of which in the preferred embodiment there extend radially outwardly preferably integral annular plates 9,9' and 10,10' defining the generating channel. They are formed from a heat and abrasion resistant refractory material and while the generator is in operation the rotors carrying them rotate at appropriate speed, driven, if desired, by suitable energizing means (not shown) attached to the rotors. Annular electrodes 11, 12 having connection through means for collecting the generated electric current, such as brushes 13, 13' with conductors 15, 16 form an electrical circuit with a load 17 which utilizes the current produced by the generator.

The rings 8,8' when forming parts of rotors used for power generation in magnetic fields preferably contain conductive plates 14 or other suitable conductive inserts embedded in the rings 8,8' and having exposed electrically conductive surfaces for receiving the generated energy being inwardly electrically interconnected so as to enable the current they accumulate to be drawn by the brushes 13,13' or the like, remote from the channel, for transmission to and from the load.

It will be evident that in accordance with principles established by Michael Faraday's experiments in the early XIX century the passage of the high temperature gaseous fluid through the magnetic field maintained by magnet 4 generates electrical energy which is accumulated as an electrical current in electrodes 11, 12 to supply the load 17, as is more fully explained in the publication to which reference has been made, and the generator embodying the invention involves no departure from the said principles. However, by maintaining, in effect, moving surfaces, defining at least in part the channel of the MHD generator erosion of the refractory material presenting said surfaces is minimized, reducing the time which the MHD unit must be shut down for repair or replacement of the material defining the said channel as compared with the generators in which all surfaces of the channel are stationary.

It will furthermore be evident that rotors similar to rotors 6,6', but not being required to contain electrically conductive plates or the like in their ring sections may be used for the confining surfaces of the combustion chamber 2 as well.

It may be noted that when there is an appreciable pressure differential, between the interior of the channel 3 in the zone in which it is defined, at least in part, by rotors 6,6' and the ambient atmosphere, it is usually advisable to give to these structures at their complementary relatively moveable portions configurations such as may limit or prevent leakage of gaseous fluid from the channel.

Moreover, through control of the rotational speed of the rotors 6,6' when the unit is in operation it is possible to maintain a desirable operating temperature of those segments of the rotors at any one time providing confining surfaces for the channel 3 while accessibility of the remaining channelforming surfaces of the rotors permits these surfaces to be cooled and cleaned while the unit is in operation, thus minimizing interference in the operation of the unit by accumulation of foreign particles of the like on these surfaces.

I claim:

1. A magnetohydrodynamic electrical energy generating unit comprising a source of high temperature gaseous fluid flowing in a stream, means maintaining a magnetic field comprising lines of force penetrating said stream and extending normal to the direction of flow of said stream, and movable means defining a portion of a confining structure restricting the flow of said stream through said magnetic field and adapted for progressive movement of successive portions thereof into and out of said field substantially in parallelism with a plane of the direction of flow of said stream.

2. A generating unit as defined in claim 1 in which the movable means comprise a ring presenting a segment of a cylindrical surface confining the stream within said magnetic field, said ring being rotatable about an axis normal to the direction of flow of said stream.

3. A generating unit as defined in claim 1 in which said movable means comprise a ring presenting a segment of a cylindrical surface and an annular plate of refractory material carried by said ring and projecting from an edge thereof into said magnetic field and defining with said ring a portion of said confining structure.

4. A generating unit as defined in claim 1 in which parallel annular plates are carried by said movable means and define opposed annular confining surfaces extending parallel to the direction of flow of said stream.

5. A generating unit as defined in claim 4 in which said parallel plates carry an electrical conductor having a segment extending into said magnetic field, and means associated with said conductor remote from said field for conducting electrical energy in a circuit containing a load.

6. A generating unit as defined in claim 1 in which said movable means comprise a pair of rotors each comprising a rotatable ring and spaced annular plates carried by said ring, said rotors being rotatable about parallel axes normal to the direction of flow of said stream, and means electrically connected with said rotors for conducting electrical energy generated by said stream.

* * * * *